(12) United States Patent
Huo et al.

(10) Patent No.: US 8,365,242 B2
(45) Date of Patent: Jan. 29, 2013

(54) METHOD AND APPARATUS FOR CONFIDENTIAL KNOWLEDGE PROTECTION IN SOFTWARE SYSTEM DEVELOPMENT

(75) Inventors: Zhen Zhong Huo, Beijing (CN); Ying Liu, Beijing (CN); Hui Su, Beijing (CN); Xin Zhou, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 12/394,890

(22) Filed: Feb. 27, 2009

(65) Prior Publication Data

US 2009/0222883 A1 Sep. 3, 2009

(30) Foreign Application Priority Data

Feb. 29, 2008 (CN) .......................... 2008 1 0082248

(51) Int. Cl.
*G06F 21/00* (2006.01)
(52) U.S. Cl. ............ 726/1; 717/100; 717/101; 717/102; 717/103; 705/50
(58) Field of Classification Search ..................... 726/1; 717/141–143, 100–103, 124–126; 705/50
See application file for complete search history.

(56) References Cited

U.S. PATENT DOCUMENTS

| 7,359,865 | B1 * | 4/2008 | Connor et al. ............... 705/7.28 |
| 7,487,545 | B2 * | 2/2009 | Hall et al. ....................... 726/25 |
| 7,797,245 | B2 * | 9/2010 | Pedersen ........................ 705/59 |
| 7,930,727 | B1 * | 4/2011 | Baize et al. ...................... 726/1 |
| 7,940,929 | B1 * | 5/2011 | Sengupta ........................ 380/51 |
| 2004/0093248 | A1 * | 5/2004 | Moghe ............................. 705/7 |
| 2006/0095276 | A1 | 5/2006 | Axelrod |
| 2006/0143459 | A1 * | 6/2006 | Villaron et al. ............... 713/176 |
| 2007/0074169 | A1 * | 3/2007 | Chess et al. .................... 717/126 |
| 2007/0110224 | A1 | 5/2007 | Gumpel |
| 2007/0220016 | A1 * | 9/2007 | Estrada et al. ............... 707/100 |

OTHER PUBLICATIONS

Liu, Ying, "A Case Study on Community-enabled SOA Application Development", Jun. 20, 2007, pp. 309-316 http://ieeexplore.ieee.org/xpls/abs_all.jsp?arnumber=4273441&tag=1.*
Xin Zhou, "Toward Protective Knowledge Protection in Community-based Software Development", May 2, 2010, pp. 76-83 http://dl.acm.org/citation.cfm?id=1833323.*
Liu, Ying, "A Case Study on Community-enabled SOA Application Development", Jun. 20, 2007, pp. 309-316 http://ieeexplore.ieee.org/xpls/abs_all.jsp?arnu mber=4273441 &tag=1.*

(Continued)

*Primary Examiner* — Jung Kim
*Assistant Examiner* — Carlos M De Jesus, Jr.
(74) *Attorney, Agent, or Firm* — Gail H. Zarick; Otterstedt, Ellenbogen & Kammer, LLP (57) ABSTRACT

An apparatus and a computer-implemented method for protecting confidential knowledge in a software system design which includes a plurality of artifacts. The method includes the steps of calculating a correlation between the confidential knowledge and the software system design, acquiring inter-dependencies between the artifacts in the software system design, and determining protection mechanisms for the respective artifacts according to the correlation and the inter-dependencies. The system includes a correlation calculating section for calculating a correlation between the confidential knowledge and the software system design; an inter-dependency acquiring section for acquiring inter-dependencies between the artifacts in the software system design; and a mechanism designing section for determining protection mechanisms for the respective artifacts according to said correlation and said inter-dependencies.

8 Claims, 4 Drawing Sheets

OTHER PUBLICATIONS

Matthew J. LaMantia, "Evolution Analysis of Large-Scale Software Systems Using Design Structure Matrices & Design Rule Theory", 2007, pp. 1-10 http://citeseerx.ist.psu.edu/viewdoc/summary?doi=10.1.1.111.6345.*

Xin Zhou, "Toward Protective Knowledge Protection in Community-based Software Development", May 2, 2010, pp. 76-83 http://dl.acm.org/citation.cfm?id=1833323.*

Elisa Bertino, "Secure Knowledge Management: Confidentiality, Trust, and Privacy," Feb. 1, 2005, pp. 429-438, http://www.utd.edu/~lkhan/papers/TSMC'06.pdf.*

Tyson Browning, "Applying the Design Structure Matrix to System Decomposition and Integration Problems: A Review and New Directions," Aug. 3, 2000, pp. 292-306 http://ieeexplore.ieee.org/stamp/stamp.jsp?tp=&arnumber=946528.*

\* cited by examiner

METHOD AND APPARATUS FOR CONFIDENTIAL KNOWLEDGE PROTECTION IN SOFTWARE SYSTEM DEVELOPMENT

CROSS REFERENCE TO RELATED APPLICATION

This application claims priority under 35 U.S.C. §119 from Chinese Patent Application No. 200810082248.1 filed Feb. 29, 2008, the entire contents of which are incorporated by reference herein.

BACKGROUND OF THE INVENTION

1. Field of the Invention

The present invention relates generally to a software development process. More particularly, the present invention relates to confidential knowledge protection in the software development process.

2. Description of the Related Art

An enterprise usually owns some critical knowledge (or called "confidential knowledge) that helps it keep the core competency among peers. The critical knowledge might be an innovative business idea, service function, unique business process or optimized IT architecture, for example. Due to the significance of such critical knowledge, enterprises have strong intention to keep it as an enterprise-wise secret or even keep it between several core members.

However, the confidential knowledge is prone to exposure for various reasons. A typical one is that enterprises often leverage external resources to develop their software systems. Although such action reduces cost and allows the enterprise to focus on its core business, the confidential knowledge is in risk of exposure to external resources.

Most of the existing solutions for confidential knowledge protection in software development can be categorized as "physical solutions" and "legal solutions". For "physical solutions", regulations and/or mechanisms are taken to physically prevent unauthorized persons from taking any documents, such as source codes, out of the office. For "legal solutions", developers, external or internal, are required to sign an NDA (Non Disclosure Agreement) with the enterprise. Once the developers release any confidential knowledge without authorization, the enterprise has the right to sue them for the disclosure.

Besides the above solutions, a related method is proposed in "Manufacturing Knowledge Protection Based Supplier Selection Model" (by Wu Feng, Li Huaizu, China Mechanical Engineering, Vol. 16, No. 8, April, 2005). This method classifies suppliers based on their originality and standardization, classifies an outsourcing strategy based on the knowledge's impact on enterprise competency and its exposure possibility, and maps a supplier type to the outsourcing strategy.

In order to protect confidential knowledge, precisely differentiating confidential knowledge contained in software design from common knowledge is an important prerequisite for knowledge protection. With it, we can focus limited effort on protecting what is really important and share as much as possible non-confidential knowledge with developers for development convenience. So far, however, identification and extraction of confidential knowledge is performed manually by software system designers and the parameters, such as the proportion of confidential knowledge in the software system design, are also subjectively judged by the designers. There has not been a means found to publicly teach, using technical means, identification and extraction of confidential knowledge and determination of the proportion of confidential knowledge. Using an artificial method per se is time-consuming and energy-exhausting and cannot attain an ideal accuracy and efficiency. Furthermore, it can be imagined that, upon a necessity of developing a huge software system and the existence of a large amount of confidential knowledge, it may be unacceptable to perform artificially the identification, extraction and determination processes for the development process in terms of the accuracy, efficiency and resource consumption problems.

Moreover, the confidential knowledge protection mechanisms are selected at random at present and lack a scientific analysis and guidance.

Therefore, there is a need for a more effective method for identifying and extracting confidential knowledge embedded in software artifacts, quantifying the confidential knowledge, thereby designing appropriate protection mechanisms.

SUMMARY OF THE INVENTION

In view of the above, the present invention provides a system and method capable of effectively identifying and extracting confidential knowledge embedded in software artifacts, quantifying the confidential knowledge, thereby designing appropriate protection mechanisms.

The present invention provides a computer-implemented method for protecting confidential knowledge in a software system designing process, the software system design including a plurality of artifacts, the method including the steps of calculating a correlation between the confidential knowledge and the software system design, acquiring inter-dependencies between the artifacts in the software system design, and determining protection mechanisms for the respective artifacts according to the correlation and the inter-dependencies.

The present invention further provides a system for protecting confidential knowledge in a software system designing process, the software system design including a plurality of artifacts, the system including a correlation calculating section for calculating a correlation between the confidential knowledge and the software system design, an inter-dependency acquiring section for acquiring inter-dependencies between the artifacts in the software system design and a mechanism designing section for determining protection mechanisms for the respective artifacts according to the correlation and the inter-dependencies.

The present invention provides a systematic method and a supportive tool capable of effectively identifying and extracting confidential knowledge and thereby designing a systematic protection mechanism, so as to help the enterprise proactively hiding confidential knowledge before delivering software development tasks to those developers not authorized to access the knowledge.

DETAILED DESCRIPTION OF THE PREFERRED EMBODIMENTS

The embodiments of the present invention can be provided in the form of a method, system or computer program product. Thus, the present invention can adopt full-hardware embodiments, full-software embodiments or embodiments of the combination of hardware and software. The typical combination of hardware and software can be a universal computer system with a computer program, and when the program is loaded or executed, the above method can be performed by controlling the computer system.

Referring to the preferred modes for carrying out the present invention, the principles of the present invention are explained above. However, these explanations are only exemplary and should not be understood as any limitation over the present invention.

Figure 1:
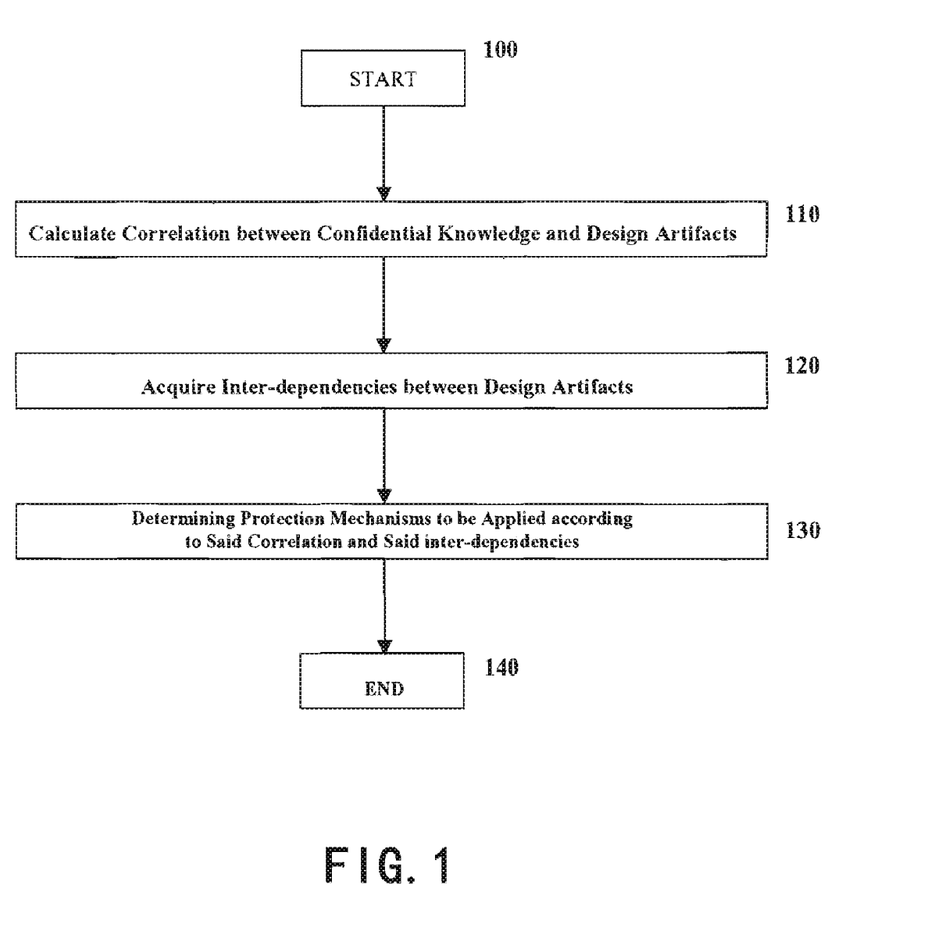
FIG. 1 is a flowchart of the computer-implemented method for protecting confidential knowledge in a software designing process according to the present invention.

Referring to FIG. 1, a flowchart of the computer-implemented method for protecting confidential knowledge in a software system designing process is provided according to the present invention. This method starts with step 100 and then proceeds to step 110, in which a correlation between the confidential knowledge and the software system design is calculated. Next, in step 120, inter-dependencies between the artifacts included in the software system design are acquired. Subsequently, in step 130, protection mechanisms for the respective artifacts are determined according to the correlation and the inter-dependencies. Finally, this method ends in step 140.

Figure 2:
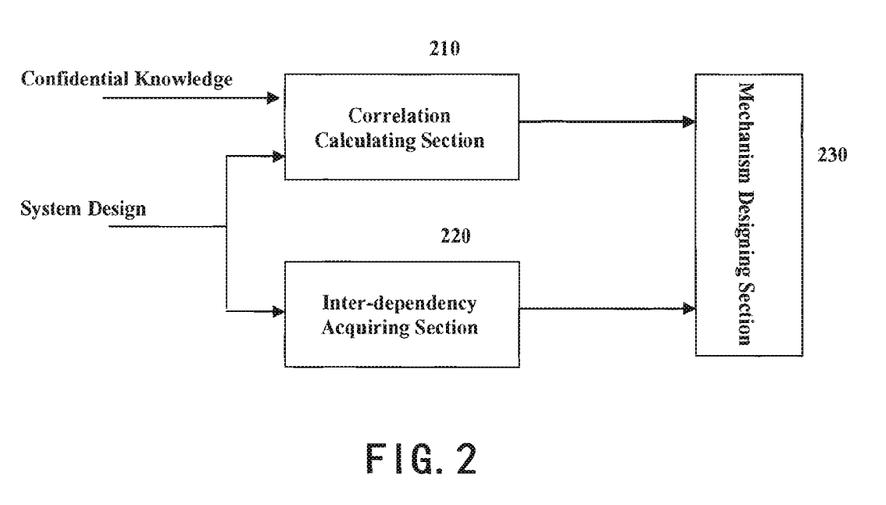
FIG. 2 is a block diagram of the system for protecting confidential knowledge in a software designing process according to the present invention.

FIG. 2 is a block diagram of the system for protecting confidential knowledge in a software system designing process according to the present invention. The system 200 includes a correlation calculation section 210, an inter-dependency acquiring section 220, and a mechanism designing section 230, wherein the correlation calculating section 210 is used for calculating a correlation between the confidential knowledge and the software system design. The inter-dependency acquiring section 220 is used for acquiring inter-dependencies between the artifacts included in the software system design and the mechanism designing section 230 is used for determining protection mechanisms for the respective artifacts according to the correlation and the inter-dependencies.

The method and system of the present invention can automatically identify and quantify the confidential knowledge, thereby more effectively implementing protection of the confidential knowledge.

According to the present invention, the software system design is divided into different parts with an "artifact" unit. According to the requirement for the software system design, the "artifacts" can be modules, Java™ classes, methods, packets, and files, for example.

Figure 3:
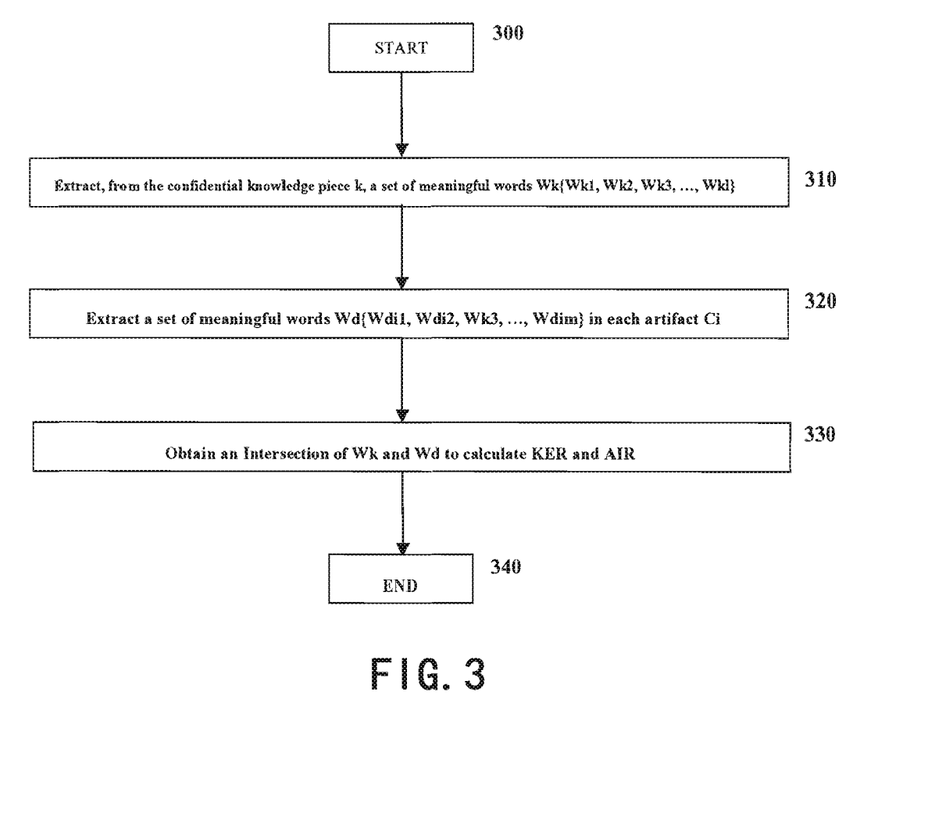
FIG. 3 shows a specific operation mode of the correlation calculating section as shown in FIG. 2.

Referring to FIG. 3, the specific operation mode of the correlation calculating section 210 is described below. Before this, two key terms, "knowledge exposure rate" (KER) and "artifact involving rate" (AIR), used in the present invention are first explained. The "knowledge exposure rate" means the percentage of a confidential knowledge piece implied in an artifact of the software system design and the "artifact involving rate" means the percentage of the artifact that really related to the confidential knowledge piece.

Those skilled in the art understand that the confidential knowledge may include service function, business idea, unique business process, optimized IT architecture, and so on, and can be expressed in a plurality of forms such as natural language text, XML language text or ontology. Furthermore, the type of the software system design is usually a UML design model and is expressed in the form of XML text. However, other design models are also applicable to the present invention, so long as the models have a computer-understandable model.

By taking the confidential knowledge of the service function type and the software system design model of the UML type as an example, the preferred embodiment of the present invention is illustrated below. As described above, the confidential knowledge of the service function type is usually described in natural language text, while the UML design model is usually described in XML text. The method of the present invention employs a lexical segmentation property of natural language text and XML language text.

Specifically, the method of the present invention is as shown in FIG. 3. This method starts with step 300 and then proceeds to step 310, in which meaningful words in a confidential knowledge piece k are extracted (for example, by performing segmentation) to obtain a lexical set $Wk\{Wk_1, Wk_2, Wk_3, \ldots, Wk_l\}$. Next, in step 320, meaningful words in each artifact Ci are extracted to obtain a lexical set $Wd\{Wdi_1, Wdi_2, Wd_3, \ldots, Wdi_m\}$. Subsequently, in step 300, an intersection of the lexical set of each artifact Ci and the lexical set of the confidential knowledge piece k is obtained, and the magnitude of the intersection is assumed to be x, thereby calculating:

$$KER(\text{of } Ci \text{ to } K) = x/l,$$

$$AIR(\text{of } Ci \text{ to } K) = x/m \quad (1).$$

The method as shown in FIG. 3 ends in step 340.

Those skilled in the art understand that, the preferred embodiment of the present invention is illustrated by taking the confidential knowledge of the service function type and the software system design model of the UML type as an example, but the present invention is not limited to this. In fact, so long as a meaningful portion in the confidential knowledge piece and a meaningful portion in the design artifact can be extracted and an intersection of both is obtained so as to quantify the relationship between the confidential knowledge piece and the design artifact, the confidential knowledge of any type and the software system design model of any type can be applied to the present invention.

The method as shown in FIG. 3 is illustrated by means of a simple example.

Assume that a client needs to develop financial software wherein a service function related to withdrawal is the confidential knowledge the client needs to protect. The service function can be described using the following natural language: for withdrawal, a user selects an account and inputs the sum; then the system checks a balance of the account and executes a transaction in the case of a sufficient balance.

The model of the software system to be designed is as follows:

```
class withdrawal{
    account: int;
    sum: float;
    boolean check balance( );
    void execute transaction( );
}
```

As for the sentence of the service function, the meaningful words therein can be extracted by performing segmentation. The segmentation process, for example, may include the steps of: segmenting the whole sentence into different clauses by means of punctuations, and then extracting the meaningful words from the sentence by filtering out the words without a specific meaning such as the preposition, conjunction and auxiliary word. By performing the above process on the service function, a set of 11 meaningful words including withdrawal, user, select, account, input, sum, system, check, balance, execute and transaction, can be obtained.

As for the software system design, it is possible to obtain a set of 7 meaningful words including withdrawal, account, sum, check, balance, execute and transaction, by extracting those tags containing names from the XML language and then performing segmentation on the extracted names.

After obtaining the above two sets, an intersection thereof is obtained and the magnitude of the intersection is obtained as 7.

Thus, KER and AIR can be obtained according to the foregoing formula (1), that is:

KER=7/11,

AIR=7/7.

Furthermore, according to the preferred embodiment of the present invention, a correcting section can further be provided after the above calculating process, so that the designers can correct the automatically calculated KER and AIR if necessary.

According to another preferred embodiment of the present invention, in the process of calculating KER and AIR, the respective words can be weighted based on the confidentiality, type, understandability and other factors of the confidential knowledge.

By taking a UML designing tool as an example, a method of automatically acquiring relationships between the artifacts by the inter-dependency acquiring section 220 is described. UML is the currently mainstream software designing model and the UML model is usually stored as an XML document. Thus, only by using an XML document parsing program, the relationships between the artifacts in the UML model can be obtained automatically. In other words, it is only necessary to seek for a node expressing classes, correlation, succession and dependency in the XML document storing the UML model, so as to easily obtain the relationship between the classes. The technique relating to acquiring the relationship between the artifacts is well-known in the art and will not be described here in detail.

Figure 4:
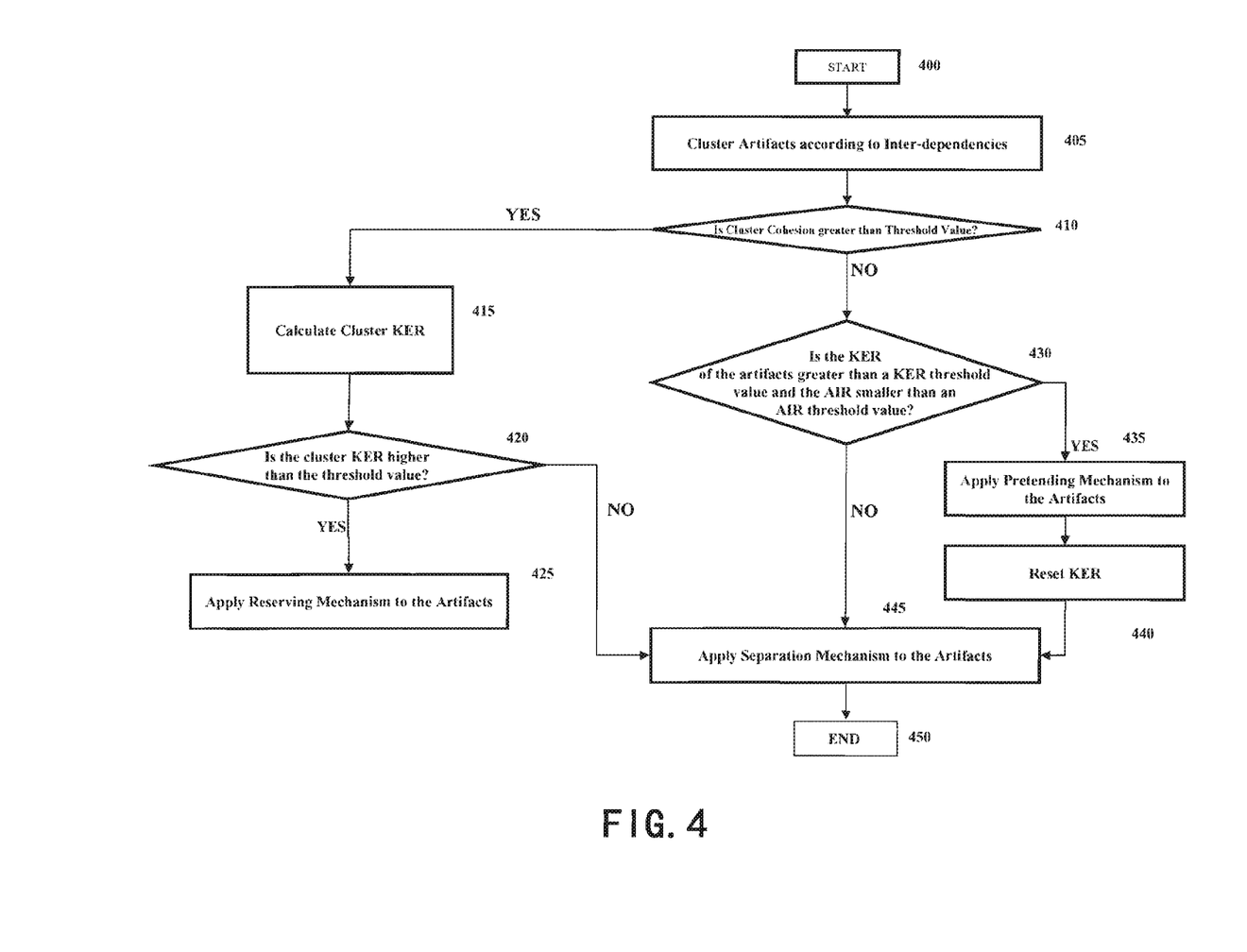
FIG. 4 shows a specific operation mode of the mechanism designing section as shown in FIG. 2.

Referring to FIG. 4, a method of selecting appropriate protection mechanisms by the mechanism designing section 230 is described below.

The steps of reserving, pretending and separating are three intuitive protection mechanisms. Reserving is to keep the software artifacts among the authorized developers, so that only the authorized developers have access to the confidential knowledge. Pretending is to make up the software artifacts before delivering it to unauthorized developers so as to hide the confidential knowledge. Separation is to distribute the software artifacts to multiple unauthorized developers so that each of them can only learn broken-up segments of the confidential knowledge. Each of the above protection mechanisms has its own applicable condition and application cost, but the confidential knowledge protection mechanisms are selected at random at present and lack a scientific analysis and guidance. However, the present invention determines what protection mechanisms are applied to the software artifacts according to the correlation and inter-dependencies output from the correction calculating section 210 and the inter-dependency acquiring section 220, as shown in FIG. 2.

The method as shown in FIG. 4 starts with step 400 and then proceeds to step 405, in which the artifacts are divided into different clusters according to the inter-dependencies between the artifacts obtained by the inter-dependency acquiring section 220. In step 410, it is determined whether a cohesion of the respective clusters is greater than a specific threshold value. It can be appreciated that, if artifacts in a high cohesion cluster are distributed to several developers for developing, their close inter-dependency will cause more communication efforts and bring much difficulty for integration. Accordingly, it is preferred to have one developer to develop all the artifacts in the high cohesion cluster. If a result of the determination in step 410 is "YES", the method advances to step 415 in which the KER of the cluster is calculated (that is, the KERs of the respective artifacts included in the cluster are added). Then, it is determined in step 420 whether the KER of the cluster is greater than the threshold value. If a result of the determination in step 420 is "YES", the method proceeds to step 425 to decide to apply the "reserving" mechanism to all the artifacts in the cluster. When the KER of the cluster is high, the software development tasks should be distributed to the developers authorized to access the knowledge. If a result of the determination in step 420 is "No", the method proceeds to step 445, in which the separation protection mechanism is applied to the software development tasks. In view of the high cohesion cluster, the software development tasks should preferably be distributed to one unauthorized developer.

If the result of the determination in step 410 is "No", that is, the cohesion of the cluster is not greater than the specific threshold value, the method proceeds to step 430, in which it is further determined whether the KER of the artifacts are higher than a KER threshold value and whether the AIR is lower than an AIR threshold value. If "YES", the method advances to step 435, in which the pretending mechanism is applied to the artifacts satisfying the conditions, and subsequently, the KER is reset as "0" in step 440. Thereafter, the method proceeds to step 445 to apply the separation protection mechanism to the "pretended" knowledge. If the result of the determination in step 430 is "No", that is, the relationship between the confidential knowledge and the design artifacts does not satisfy the condition in step 430, the method directly advances to step 445 to apply the separation protection mechanism to the knowledge. Finally, the method ends in step 450.

Upon selecting those artifacts to which the pretending mechanism is applicable, although pretending can protect the confidential knowledge well by only making up the artifacts, it usually makes the artifacts not easy to understand, and it's costly to conduct a complete and effective "pretending". Thus, it is advised to apply the pretending mechanism to the confidential knowledge with a high KER and a low AIR. The high KER implies pretending this artifact will protect this knowledge piece well, and the low AIR implies the cost for pretending will be low.

Finally, all the artifacts (except those that have been reserved) are separated so that each group only owns a small percentage of the confidential knowledge. Here, it is necessary to set some criterion for the separation, for example, each group can own less than 30% of each knowledge piece. Also, when calculating the group's total exposure rate, the pretended artifact's exposure rate can be regarded as "0."

It should be noted that the threshold values in different stages or steps can be set according to the requirements for the software system design in the above method of the present invention.

After the mechanism designing section 230 selects appropriate protection mechanisms for the different artifacts, it is possible to implement the corresponding protection mechanisms based on the selected mechanisms. This includes, for example, replacing symbols that might reveal critical knowledge for the "pretending" mechanism, separating artifacts into groups to meet the set separation criterion for the "separation" mechanism. After this, post-processed software artifacts can be delivered to authorized developers and unauthorized developers for development. By using the present invention, it is possible to more precisely and effectively extract and identify the confidential knowledge and to automatically combine a plurality of protection mechanisms into a protective solution having an ideal benefit-to-cost ratio.

The present invention can be embedded into a computer program product, which includes all the features which enable the described method to be implemented. The computer program product is contained in one or more computer readable storage media, including but not limited to a disk storage, a CD-ROM, and an optical memory, and the computer readable storage media have computer readable codes contained therein.

The present invention is explained above with reference to the flow chart and/or block diagram of the method, system and computer program product according to the present invention. Each block in the flow chart and/or block diagram and the combination of the blocks therein can be obviously realized by computer program instructions. These computer program instructions can be supplied to a processor of a universal computer, a dedicated computer, an embedded processor or other programmable data processing devices to produce a machine, so that the instructions (through the processor of a computer or other programmable data processing devices) produce an apparatus for realizing the functions specified in one or more blocks in the flow chart and/or block diagram.

These computer program instructions can also be stored in one or more computer readable memories and each of the read memories can direct the computer or other programmable data processing devices to function according to a specified mode. Thus, the instructions stored in the computer readable memories produce a manufacturing product, which includes an instructing means for realizing the functions specified in one or more blocks in the flow chart and/or block diagram.

The computer program instructions can also be loaded to one or more computers or other programmable data processing devices so as to perform a series of operating steps on the computers or other programmable data processing devices, so that a computer-implemented process can be produced on each of these devices. Thus, the instructions executed on these devices provide the steps specified in one or more blocks in the flow chart and/or block diagram.

Those skilled in the art will recognize that the present invention can be modified and transformed without departing from the spirits and scope of the appended claims.

What is claimed is:

1. A system for protecting confidential knowledge in a software system design which includes a plurality of artifacts, said system comprising:
a memory;
at least one processor, coupled to said memory, and
a tangible, computer-readable storage medium, embodying in a non-transitory manner instructions which, when loaded into said memory, configure said at least one processor to be operative to:
calculate a correlation between the confidential knowledge and the software system design by calculating a knowledge exposure rate KER and an artifact involving rate AIR of the confidential knowledge, where KER=x/l, AIR=x/m, l is a magnitude of a set of meaningful words in the confidential knowledge, m is a magnitude of a set of meaningful words in the artifacts, and x is a magnitude of an intersection of the set of meaningful words in the confidential knowledge and the set of meaningful words in the artifacts;
acquire inter-dependencies between the artifacts in the software system design; and
determine protection mechanisms relating to a selection of software developers for the respective artifacts according to said correlation and said inter-dependencies.

2. The system according to claim 1, wherein said tangible, computer-readable recordable storage medium further comprises instructions which, when loaded into said memory, configure said at least one processor to be operative to acquire inter-dependencies between the artifacts in the software system design based on a parsing program corresponding to the software system design.

3. The system according to claim 2, wherein the artifacts are clustered according to said inter-dependencies, and the tangible, computer-readable recordable storage medium further comprises instructions which, when loaded into said memory, configure said at least one processor to be operative to apply a reserving mechanism to the confidential knowledge having a cluster cohesion greater than a specific threshold value and a cluster KER greater than a threshold value.

4. The system according to claim 1, wherein the artifacts are clustered according to said inter-dependencies, and the tangible, computer-readable recordable storage medium further comprises instructions which, when loaded into said memory, configure said at least one processor to be operative to apply a pretending mechanism to the confidential knowledge having a cluster cohesion not greater than a specific threshold value, if the KER thereof is greater than a KER threshold value and the AIR thereof is smaller than an AIR threshold value.

5. The system according to claim 4, wherein the tangible, computer-readable recordable storage medium further comprises instructions which, when loaded into said memory, configure said at least one processor to be operative to apply a separating mechanism to the confidential knowledge having the KER not greater than the KER threshold value and the AIR not smaller than the AIR threshold value.

6. A system comprising:
a memory;
at least one processor, coupled to said memory, and
a tangible, computer-readable storage medium, embodying in a non-transitory manner instructions which, when loaded into said memory, configure said at least one processor to be operative to:
1) extract from a confidential knowledge piece a first set of meaningful words, 2) extract from artifacts in a software system design a second set of meaningful words in each artifact, 3) obtain an intersection of the first and second sets of meaningful words, 4) calculate a percentage of the confidential knowledge piece in each artifact of the software system design, and 5) calculate a percentage of each artifact related to the confidential knowledge piece;
obtain relationships between artifacts, and
1) divide the artifacts into different clusters according to the relationships between artifacts obtained by an inter-dependency acquiring section, 2) determine whether a cohesion of the respective clusters is greater than a first threshold value, 3) if the cohesion is greater than the first threshold value, determine whether the percentage of the confidential knowledge piece in the cluster is higher than a second threshold value, and 4) if the percentage of the confidential knowledge piece in the cluster is higher than the second threshold, determine that access to the software artifacts should be reserved to authorized software developers.

7. The system of claim 6, wherein the tangible, computer-readable recordable storage medium further comprises instructions which, when loaded into said memory, further configure said at least one processor to be operative to: 5) if the cohesion cluster is not greater than the first threshold value, determine whether the percentage of the confidential knowledge piece in the artifacts is greater than a KER threshold value and whether the percentage of the artifacts related to the confidential knowledge piece is lower than an AIR threshold value, and 6) determine whether the artifacts should be distributed to multiple software developers.

8. The system of claim 7, wherein the software system design is a UML design model expressed in XML text.

* * * * *